(12) United States Patent
Takahashi

(10) Patent No.: US 8,978,968 B2
(45) Date of Patent: Mar. 17, 2015

(54) TIRE SORTING APPARATUS

(75) Inventor: Yohei Takahashi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 132 days.

(21) Appl. No.: 13/576,045

(22) PCT Filed: Feb. 2, 2011

(86) PCT No.: PCT/JP2011/052123
§ 371 (c)(1),
(2), (4) Date: Sep. 4, 2012

(87) PCT Pub. No.: WO2011/096422
PCT Pub. Date: Aug. 11, 2011

(65) Prior Publication Data
US 2012/0325903 A1 Dec. 27, 2012

(30) Foreign Application Priority Data
Feb. 2, 2010 (JP) .................. 2010-021635

(51) Int. Cl.
| | | |
|---|---|---|
| G06F 17/00 | (2006.01) | |
| G06K 7/00 | (2006.01) | |
| B60C 25/00 | (2006.01) | |
| B60C 25/132 | (2006.01) | |
| B07C 5/34 | (2006.01) | |
| B60C 13/00 | (2006.01) | |

(52) U.S. Cl.
CPC ............. *B07C 5/3412* (2013.01); *B60C 13/001* (2013.01)
USPC .............. 235/375; 235/435; 73/146; 157/1.1; 157/1.17

(58) Field of Classification Search
USPC .............. 235/375, 435; 73/146; 157/1.1, 1.17
See application file for complete search history.

(56) References Cited

U.S. PATENT DOCUMENTS 5,255,728 A * 10/1993 Nojiri et al. .................. 157/1
6,615,649 B1    9/2003 Kokubu et al.

FOREIGN PATENT DOCUMENTS

| JP | A-62-157122 | 7/1987 |
|---|---|---|
| JP | U-4-16348 | 2/1992 |
| JP | A-4-338530 | 11/1992 |
| JP | A-2000-343918 | 12/2000 |
| JP | A-2006-65668 | 3/2006 |
| JP | A-2009-276892 | 11/2009 |

OTHER PUBLICATIONS

International Preliminary Report on Patentability issued in International Application No. PCT/JP2011/052123 dated Sep. 18, 2012.
Extended Search Report issued in European Patent Application No. 11739770.3 dated Aug. 28, 2013.
May 24, 2011 English Language Translation of the International Search Report issued in Patent Application No. PCT/JP2011/052123.

* cited by examiner

*Primary Examiner* — Michael G Lee
*Assistant Examiner* — Laura Gudorf
(74) *Attorney, Agent, or Firm* — Oliff PLC

(57) ABSTRACT

A tire sorting apparatus for reliably reading information from a tire identifier, such as a barcode, formed on the surface of a tire without damaging the tire. Placed under a tire mounting table is a tire grip means which has three grip arms arranged circularly in a plane perpendicular to the tire center axis and link mechanisms for spreading the grip arms. Placed above the mounting table is a barcode reader rotating means for rotating a barcode reader held by a barcode reader holding means. The rotation axis of the barcode reader is aligned with the center of the circle formed by the grip arms of the tire grip means.

8 Claims, 5 Drawing Sheets

(a)

(b)

(a)

(b)

(a)

(b)

TIRE SORTING APPARATUS

TECHNICAL FIELD

The present invention relates to a tire sorting apparatus for sorting tires by reading information from tire identification markings (tire identifiers), such as barcodes, formed on the surface of tires.

BACKGROUND ART

On a conventional tire inspection line, tires brought on a conveyor or like equipment may be stopped at a midway point where information may be read from the barcode affixed to the tires. This is done to identify the type and size of the tires being inspected and sort them into the tires to be sent to the next process and elsewhere.

In one method for reading the barcode, for instance, the centering of a tire is first performed by a centering unit that grips the tire from inside with three chuck rollers. Then, with the tire gripped by this centering unit, the tire is rotated and the barcode affixed to the sidewall of the tire is read by a barcode reader installed above the tire (see Patent Document 1, for example). In another method for reading the barcode, a detection sensor for detecting the marking area of a two-dimensional code identifier and a code reader are installed underneath a roller conveyor carrying tires. The code reader is moved to the marking area of the two-dimensional code identifier detected by the detection sensor and tilted there in such a manner as to allow the reading of the two-dimensional code information through the gap between the rollers (see Patent Document 2, for example).

PRIOR ART DOCUMENT

Patent Document

Patent Document 1: Japanese Unexamined Patent Application Publication No. 62-157122
Patent Document 2: Japanese Unexamined Patent Application Publication No. 2006-65668

SUMMARY OF THE INVENTION

Problem to be Solved by the Invention

However, the method for reading a barcode while rotating the tire held by a gripping unit has a problem of occasional failure to read the barcode because of faulty rotation that can occur depending on the tire size. Also, there is the possibility of damaging the tire, which is a product for sale, due to the friction between the surface of the rotating tire and the rollers.

On the other hand, the method using a detection sensor and a code reader has also a problem of frequent reading errors, because the two-dimensional code information must be read through the gap between the rollers by moving the code reader after the marking area of the two-dimensional code identifier is detected on the moving tire by the detection sensor.

The present invention has been made in view of the foregoing problems, and an object thereof is to provide a tire sorting apparatus capable of reliably reading information from a tire identifier, such as a barcode, formed on the surface of a tire without damaging the tire.

Means for Solving the Problem

The present invention provides a tire sorting apparatus which includes a mounting means for mounting a tire in a plane perpendicular to the center axis of the tire, a tire grip means for gripping the inner periphery of the tire and positioning the center axis of the tire, an identifier reading means for reading a tire identification marking formed on the surface of the tire, and a holding means for holding the identifier reading means. The tire grip means further includes three grip arms arranged at the vertexes of a triangle within a plane perpendicular to the center axis of the tire and extending in a direction parallel to the center axis of the tire and an arm opening and closing mechanism for opening the three grip arms concentrically around the circle circumscribing the triangle. The holding means further includes a holding unit for holding the identifier reading means and a rotation drive unit for rotating the holding means around a rotating axis parallel to the center axis of the tire. And the center of the circumscribing circle is aligned with the rotating axis of the holding unit.

Thus, the centering of a tire can be accomplished with a simple structure, and also the identifier reading means can be rotated around the center axis of the tire. Therefore, the information presented by the tire identifier can be read with accuracy. And this is conducive to the reliable sorting of tires.

Also, no rotation of the tire helps prevent damage to the tire due to the friction that can occur during such rotation.

Also, the present invention further includes a tire inside diameter detecting means for detecting a tire inside diameter from positional data or travel distance data of the three grip arms when the grip arms are gripping a tire. This allows not only acquisition of information from a tire identifier of a tire but also accurate measurement of the inside diameter of the tire. Hence, the possibility of rechecking the information on the tire identifier may further improve the accuracy of tire sorting.

Also, the present invention further includes a rotation radius changing means for changing the distance between the identifier reading means and the rotation axis of the holding unit and a detecting position control means for controlling the rotation radius changing means in such a manner as to move the identifier reading means to the position of the tire identifier based on the data of the tire inside diameter detected by the tire inside diameter detecting means. Thus the rotation radius of the identifier reading means can be changed according to the tire size. Therefore, information can be read from the tire identifier even when there is a change in tire size.

Also, the present invention provides a tire sorting apparatus which has a mounting means having a plurality of rotating bodies rotating in contact with the lower surface of the tire and a through hole through which the three grip arms are extended toward the inner periphery of the tire.

Thus the tire can be held securely from below, and also the tire can be moved easily in any desired direction. Accordingly, the centering of the tire can be performed smoothly and certainly.

Also, the present invention provides a tire sorting apparatus in which the arm opening and closing mechanism includes a base which is a fixed-side member, a center pin member rotatably installed upright on the base, a plate member which is a movable-side member fixed to the center pin member, link mechanisms linking the plate member to each of the grip arms, and a drive means for driving the rotation of the plate member. And each of the link mechanisms includes a fixed-side pin member provided in a position corresponding to each of the vertexes of a polygon inscribed in a circle centered around the center axis of the center pin member on the base, a movable-side pin member provided in a position corresponding to each of the vertexes of a polygon inscribed in a circle centered around the center axis of the center pin member of the plate member, a fixed-side arm rotatably attached to the fixed-side pin member, a movable-side arm rotatably attached to the movable-side pin member, and an intermediate pin member rotatably connecting the fixed-side arm with the movable-side arm. And the three grip arms are installed upright on the fixed-side arms and the drive means rotate the plate member around the center pin member.

Thus, by implementing a structure as described above, the tire sorting apparatus may be provided with an arm opening and closing mechanism of simple structure capable of accurately moving the three grip arms to their concentric positions.

It is to be understood that the foregoing summary of the invention does not necessarily recite all the features essential to the invention, and subcombinations of all these features are intended to be included in the invention.

BEST MODE FOR CARRYING OUT THE INVENTION

Hereinafter, the invention will be described based on preferred embodiments which do not intend to limit the scope of the claims of the present invention but exemplify the invention. All of the features and the combinations thereof described in the embodiments are not necessarily essential to the invention.

Figure 1:
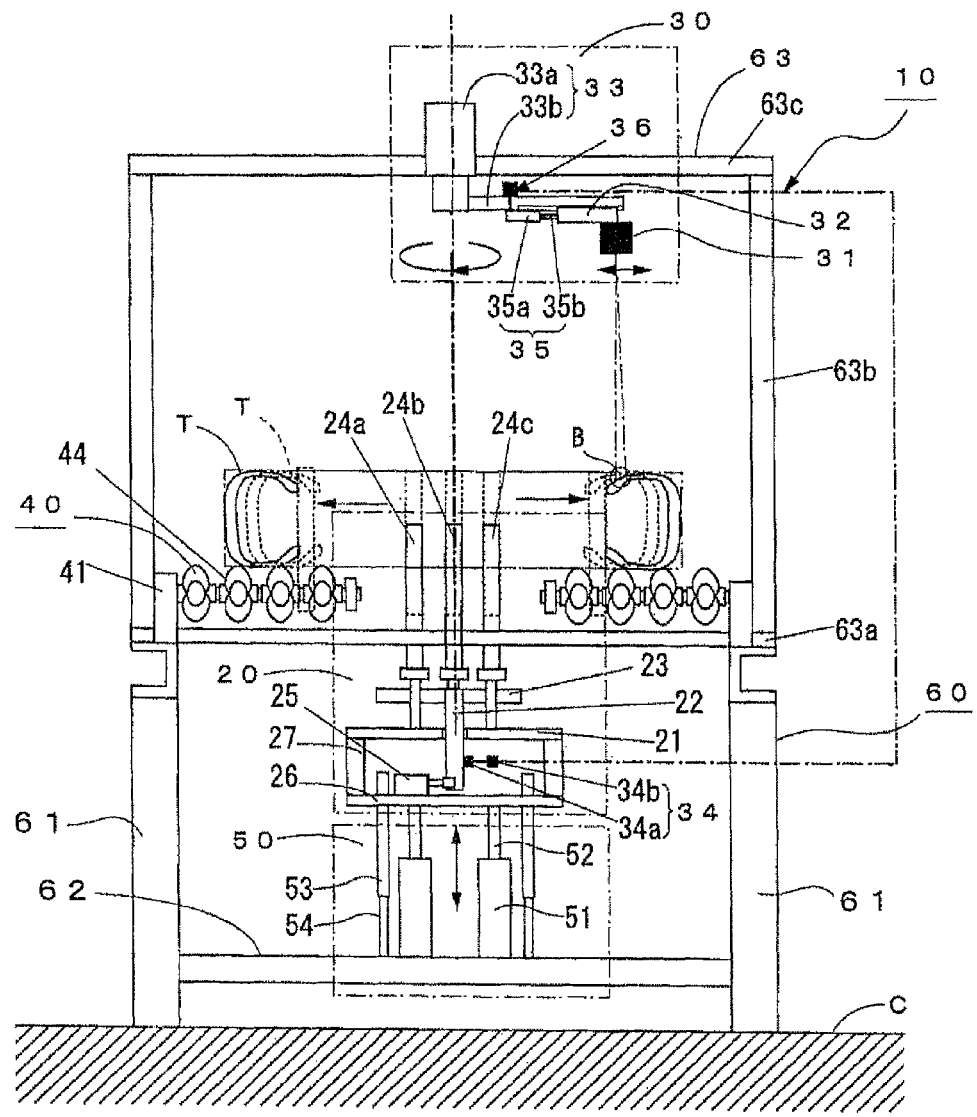
FIG. 1 is a side view showing a structure of a tire sorting apparatus according to an embodiment of the present invention.
Figure 2:
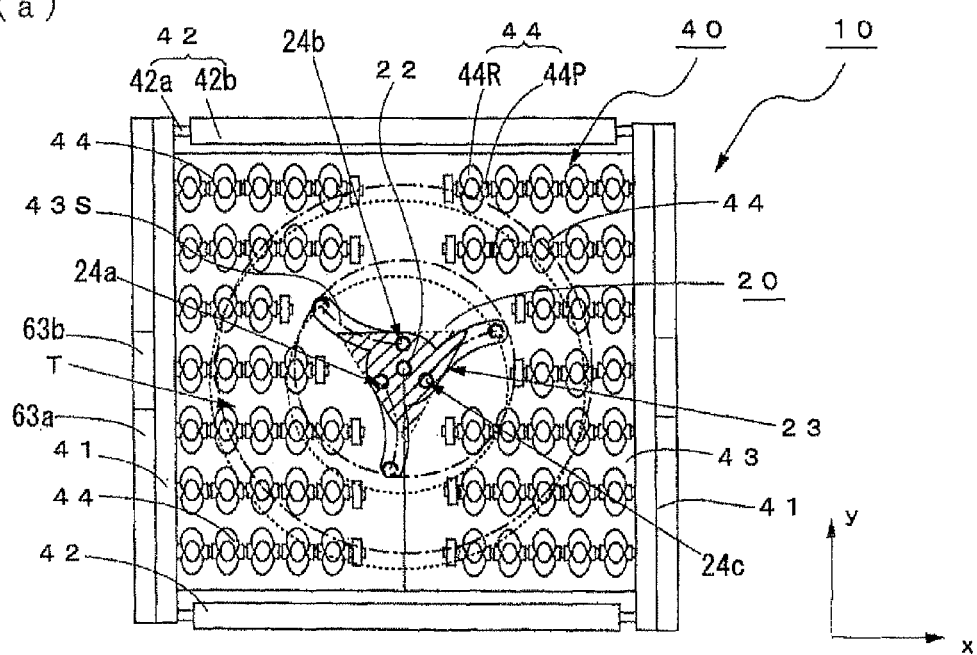
FIG. 2 is plan views of a tire sorting apparatus according to an embodiment of the present invention.
Figure 2:
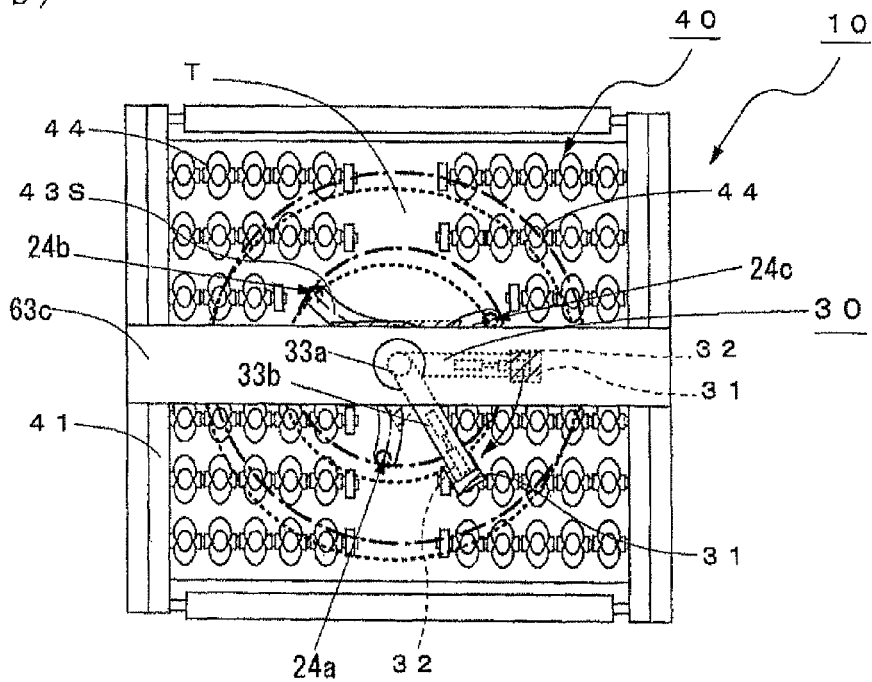

FIG. 1 is a side view showing a structure of a tire sorting apparatus 10 according to the embodiments of the present invention. FIG. 2A is a plan view of the tire sorting apparatus 10 before a barcode reading means 30 is installed, and FIG. 2B a plan view thereof after the barcode reading means 30 is installed.

The tire sorting apparatus 10 includes a tire grip means 20, a barcode reading means 30, a mounting table 40, a lifting (and lowering) means 50, and a mounting stand 60 to which these means 20 to 50 are mounted.

The mounting stand 60 consists of four legs 61, a lifting means mounting base 62, and a reading means mounting rack 63. The four legs 61 are installed upright on the floor C, and the lifting means mounting base 62 and the reading means mounting rack 63 are secured to the legs 61 horizontally in parallel with the floor surface.

The mounting table 40 is placed on top of the legs 61, and the lifting means 50 is installed on the lifting means mounting base 62. The reading means mounting rack 63 is secured to the outsides of the vertical frames 41 of the mounting table 40 on the legs 61.

Also, the tire grip means 20 is supported by the lifting means 50 from below, and the barcode reading means 30 is attached to the reading means mounting rack 63.

Figure 3:
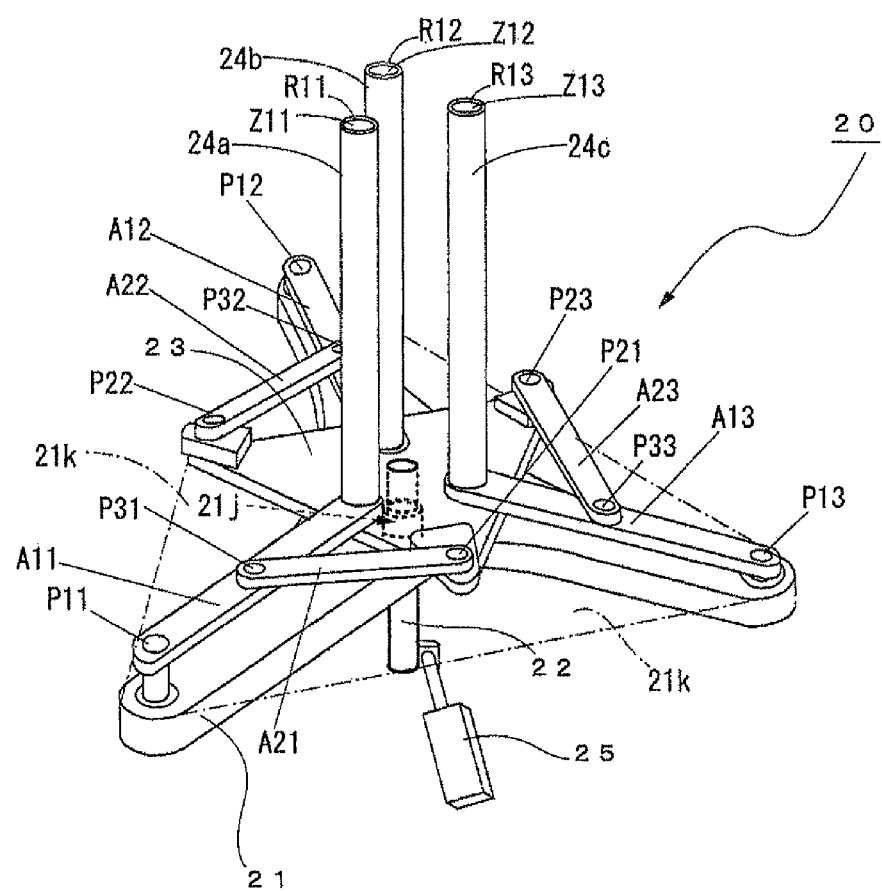
FIG. 3. is a perspective illustration showing a tire grip means according to an embodiment of the present invention.

The tire grip means 20, as shown in FIG. 3, is made up of a base 21, which is a fixed-side member of a regular triangle shaped plate with cutout portions 21k on the three sides, a center pin member 22, which is attached to the center of the base 21 via a bearing 21j, a triangular plate member 23, which is a movable-side member attached to the top of the center pin member 22, fixed-side arms A11 to A13, which are turnably attached to the base 21 via fixed-side pin members P11 to P13 at one end thereof, grip arms 24a to 24c, which are installed upright on the other end of the fixed-side arms A11 to A13 respectively, movable-side arms A21 to A23, which are turnably attached to the plate member 23 via movable-side pin members P21 to P23, intermediate pin members P31 to P33, which connect the fixed-side arms A11 to A13 with the movable-side arms A21 to A23 respectively, a cylinder 25, which is connected to the center pin member 22 and serves as a drive means for turning the plate member 23, a cylinder support base 26, which supports the cylinder 25, and a support frame 27, which is installed upright on the cylinder support base 26 and supports the base 21. Note that the cylinder support base 26 and the support frame 27 are not shown in FIG. 3 for the simplification of the illustration.

The fixed-side pin members P11 to P13 are to be of such height that the fixed-side arms A11 to A13, the movable-side arms A21 to A23, and the plate member 23 are approximately in the same plane.

Link mechanisms connecting the plate member 23 with the grip arms 24a to 24c respectively are constructed of the fixed-side pin members P11 to P13, the fixed-side arms A11 to A13, the movable-side pin members P21 to P23, the movable-side arms A21 to A23, and the intermediate pin members P31 to P33. And an arm opening and closing mechanism for moving the grip arms 24a to 24c concentrically is constructed of these link mechanisms, the base 21, the center pin member 22, and the plate member 23.

The tire grip means 20 in this embodiment has three link mechanisms.

The first link mechanism, which corresponds to the movable-side arm A21, is the link connecting the plate member 23 to the fixed-side arm A11.

The second link mechanism, which corresponds to the movable-side arm A22, is the link connecting the plate member 23 to the fixed-side arm A12.

The third link mechanism, which corresponds to the movable-side arm A22, is the link connecting the plate member 23 to the fixed-side arm A13.

The center of the base 21 and the center of the plate member 23 are connected to each other such that the triangular plate constituting the base 21 and the triangular plate constituting the plate member 23 are staggered by about 60 degrees from each other in the initial position.

The lower end of the center pin member 22 projects below the base 21, and the cylinder 25 is connected to the lower end of the center pin member 22.

Therefore, by rotating the plate member 23 by the drive of the cylinder 25, the first to third link mechanisms can be operated, thereby moving the grip arms 24a to 24c radially from the initial position toward the outside of the base 21.

The grip arms 24a to 24c, which are arranged to form a regular triangle in a plane perpendicular to the extension direction of the center pin member 22, move apart concentrically around the circle circumscribing the regular triangle of thereof along with the motion of the first to third link mechanisms. The center position of the circle circumscribing the regular triangle is the same as the position of the center pin member 22.

Hereinbelow, the circle circumscribing the regular triangle is called the circle formed by the grip arms 24a to 24c, and the grip arms 24a to 24c at the initial position are referred to as the grip arms 24a to 24c in the closed state. Also, the motion of the grip arms 24a to 24c will be referred to as the opening and closing of the grip arms 24a to 24c.

Also, the grip arms 24a to 24c in this embodiment are provided with roller shafts Z11 to Z13 and rotary rollers R11 to R 13, respectively. And the roller shafts Z11 to Z13 are installed upright on the other end portion of the fixed-side arms A11 to A13, respectively, and the rotary rollers R11 to R 13 are rotatably fitted on the outer periphery of the roller shafts Z11 to Z13, respectively, via not-shown bearings.

Thus, the tire T, which is to be sorted, can be gripped in position without suffering unnecessary damage.

The lifting means 50 is constructed of air cylinders each having a cylinder body 51 attached to the lifting means mounting base 62 and a rod 52, slide members 53 installed upright on the cylinder support base 26, and guide members 54 attached to the lifting means mounting base 62. The ends of the rods 52 of the air cylinders are connected to the bottom of the cylinder support base 26 of the tire grip means 20. And the rods 52 are reciprocated up and down, thereby moving the cylinder support base 26 of the tire grip means 20 up and down. Thus the grip arms 24a to 24c can be lifted or lowered.

It should be understood that the cylinder support base 26 may be moved up and down using a known slide mechanism, such as a rack and pinion mechanism, in the place of the lifting means 50.

The mounting table 40, as shown in FIG. 2A, is constructed of two vertical frames 41 disposed to face each other, guide rollers 42, each of which consists of a rotating shaft 42a attached at both ends to the end portions of the vertical frames 41 and a roller 42b rotatably mounted on the rotating shaft 42a, a bottom plate 43 connecting the two vertical frames 41 with each other at the bottom, and a plurality of transfer wheels disposed between the guide rollers 42. A tire T, having been brought on a not-shown conveyor, is received at one of the guide rollers and placed on the plurality of transfer wheels. In the following description, the x direction refers to the direction perpendicular to the extension direction of the vertical frames 41 when the mounting table 40 is disposed in an xy plane.

Figure 4:
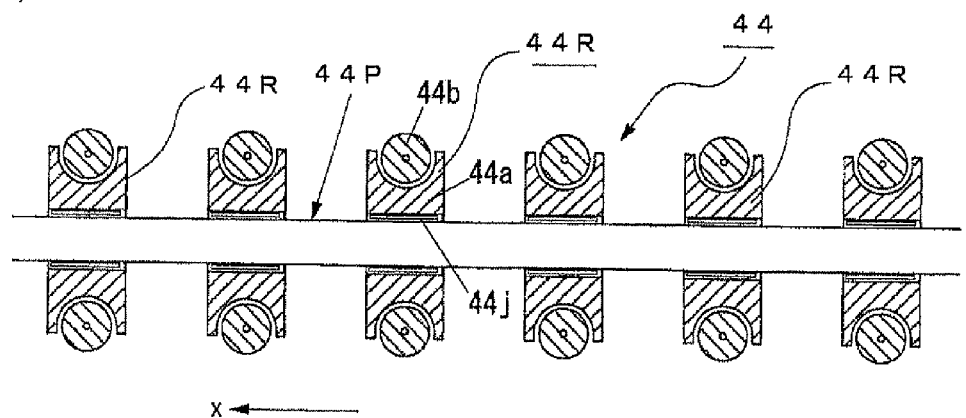
FIG. 4 is diagrams showing the details of transfer wheels used in a mounting table.
Figure 4:
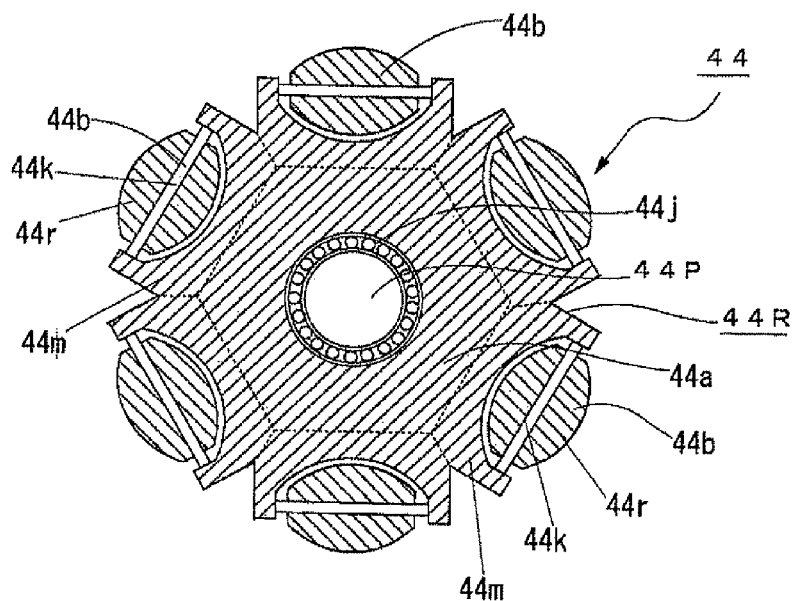

The transfer wheels 44, as shown in FIGS. 4A and 4B, are constructed of one or two rotating shafts 44P fitted to the vertical frames 41 and a plurality of rotating bodies 44R attached via a bearing 44j to the rotating shafts 44P. The rotating shafts 44P extend in the x direction.

A rotating body 44R consists of a main rotary member 44a, which is a cylinder having a polygonal (hexagonal in this case) cross section attached to the rotating shaft 44P via the bearing 44j, and a plurality of sub rotary members 44b, which are attached to the peripheral surfaces of the main rotary member 44a. The sub rotary members 44b are each constructed of a rotating shaft 44k, which extends parallel to the peripheral surface of the main rotary member 44a and in a direction perpendicular to the rotating shaft 44P, a cylindrical rotating body 44r rotatably attached to the rotating shaft 44k, and a support member 44m recessed along the outer shape of the rotating body 44r and supporting the rotating shaft 44k at both ends. It is to be noted that the support member 44m may be formed integrally with the main rotary member 44a.

The main rotary member 44a of the rotating body 44R rotates around the rotating shaft 44P, and the sub rotary member 44b rotates around the rotating shaft 44k. Therefore, when the mounting table 40 is in an xy plane, the tire T on the mounting table 40 can be easily moved in the y direction on account of the main rotary members 44a and also can be easily moved in the x direction on account of the sub rotary members 44b. In other words, the tire T on the mounting table 40 can be easily moved in any direction.

In this embodiment, a through hole 43S is provided in the bottom plate 43 of the mounting table 40, and the transfer wheels 44 are arranged away from the through hole 43S. Accordingly, the grip arms 24a to 24c from below the mounting table 40 can open wider to come in contact with the inner periphery of the tire T. The through hole 43S is formed by a circle having a larger radius than the circle delineated by the grip arms 24a to 24c in the closed state and an arc-like through hole along the locus of the grip arms 24a to 24c communicating with it.

The barcode reading means 30 is provided with a barcode reader 31, a barcode reader holding means 32, a barcode reader rotating means 33, a tire inside diameter detecting means 34, a rotation radius changing means 35, and a detecting position control means 36. All these means except for the tire inside diameter detecting means 34 are mounted on the reading means mounting rack 63. The tire inside diameter detecting means 34 is attached to the tire grip means 20.

The reading means mounting rack 63 is constructed of two horizontal plates 63a attached to the outside of the vertical frames 41 of the mounting table 40 and extending in the same direction as the vertical frames 41, vertical plates 63b installed upright on the horizontal plates 63a, and a motor mounting plate 63c bridging the tops of the vertical plates 63b.

The barcode reader 31, provided with light-emitting elements and light-receiving elements, are secured to the barcode reader holding means 32 and reads information from a barcode B affixed to the surface of the tire T.

The barcode reader rotating means 33 consists of a motor 33a and an arm 33b connected to the output shaft of the motor 33a, and the motor 33a is mounted on the motor mounting plate 63c. The barcode reader holding means 32, which is attached to an end portion of the arm 33b, holds the barcode reader 31 with its detection side facing below (toward the mounting table 40).

The tire inside diameter detecting means 34 is provided with a rotary encoder 34a for detecting the rotation angle θ of the center pin member 22 and a tire inside diameter calculating means 34b for determining the tire inside diameter by calculating the radius of the circle formed by the peripheries of the grip arms 24a to 24c from the rotation angle θ. It is to be noted that the rotation angle θ of the plate member 23 may be detected directly by the use of a position sensor or the like in the place of the rotary encoder 34a.

The rotation radius changing means 35, consisting of a linear actuator body 35a attached to the arm 33b and a rod 35b connected to the barcode reader holding means 32, causes the barcode reader holding means 32 to slide along the arm 33b.

The detecting position control means 36 controls the amount of extension or retraction of the rod 35b of the rotation radius changing means 35 based on the output of the tire inside diameter detecting means 34, thereby having the barcode reader 31 move to the circumference whose radius is the distance from the tire center to the position where the barcode B is affixed.

Note that the motor 33a to be used is preferably a geared motor equipped with a reduction mechanism or a stepping motor.

In the present embodiment, the barcode reading means 30 is mounted on the reading means mounting rack 63 in such a position that the output shaft of the motor 33a, which is the rotation center of the arm 33b, is aligned with the center of the circle formed by the grip arms 24a to 24c of the tire grip means 20.

The length of the arm 33b should be such that the barcode reader 31 is set right above the barcode affixed on the sidewall of the tire T placed on the mounting table 40.

Now the operation of the tire sorting apparatus 10 is explained.

First, a tire T having been brought on a not-shown conveyor is transferred onto the mounting table 40. Then, by operating the lifting means 50, the cylinder support base 26 of the tire grip means 20 is raised, thereby bringing the three grip arms 24a to 24c into the inside of the tire T. At this time, the three grip arms 24a to 24c are in the initial state, so that the misalignment of the center of the tire T with the center of the three grip arms 24a to 24c poses no problem.

The operation of the lifting means 50 is stopped at the point where the grip arms 24a to 24c have risen to a predetermined height. This can be accomplished by providing the lifting means 50 with a limit switch or the like that operates at the upper rise limit.

Next, the plate member 23 is turned by driving the cylinder 25 of the tire grip means 20, thereby opening the grip arms 24a to 24c wider between each other. And in a so-called centering operation, all the grip arms 24a to 24c are brought into contact with the inner periphery of the tire T, thus aligning the center of the tire T with the center of the tire grip means 20.

Since the tire T can be moved easily on the transfer wheels 44 of the mounting table 40, pushing the tire T from inside with the grip arms 24a to 24c will easily move the tire T in any direction on the xy plane.

Then, with the tire T gripped by the tire grip means 20, the motor 33a of the barcode reader rotating means is driven to rotate the arm 33b accordingly. Thus, the type and size of the tire T is identified with the barcode reader 31 reading information from the barcode D affixed to the surface of the tire T.

In this embodiment, the output shaft of the motor 33a, which is the rotation center of the arm 33b, is so set as to be aligned with the center of the circle formed by the grip arms 24a to 24c of the tire grip means 20. Hence the rotation center of the barcode reader 31, which is the rotation center of the arm 33b, can be accurately aligned with the axis of rotation of the tire T. Therefore, the barcode reader 31 can read the barcode B affixed on the surface of the tire T without fail.

After the identification of the tire T, the grip arms 24a to 24c are retracted closer to each other, and at the same time the cylinder support base 26 is lowered by the operation of the lifting means 50, thereby lowering the grip arms 24a to 24c.

Finally, the motor 33a is stopped, and then the tire T after the sorting operation is sent on a not-shown conveyor to the next process.

In the present embodiment, therefore, the tire grip means 20 which has three grip arms 24a to 24c arranged circularly in a plane perpendicular to the tire center axis and the link mechanisms for spreading the grip arms 24a to 24c are placed under the tire T mounting table 40, and the barcode reader rotating means 33 for rotating a barcode reader 31 held by a bar code reader holding means 32 is placed above the mounting table 40. And the arrangement is such that the rotation axis of the barcode reader 31 is aligned with the center of the circle formed by the grip arms 24a to 24c of the tire grip means 20. Therefore, information from the barcode B affixed to the surface of the tire T can be read with accuracy.

Also, the tire sorting apparatus 10 according to this invention allows the reading of the barcode without the rotation of the tire T, so that any damage to the tire due to the friction resulting from the rotation can be prevented.

Although the foregoing description of the embodiments has been given of a tire sorting apparatus 10 for reading a barcode B affixed on the surface of the tire T, the present invention can be applied to the reading of tire markings impressed on the sidewall of the tire T or the like.

Also, in the foregoing embodiments, the tire grip means 20 employs link mechanisms. The arrangement, however, is not limited thereto, but may be such that the three grip arms 24a to 24c are provided with three actuators by which to extend the grip arms 24a to 24c concentrically.

Figure 5:
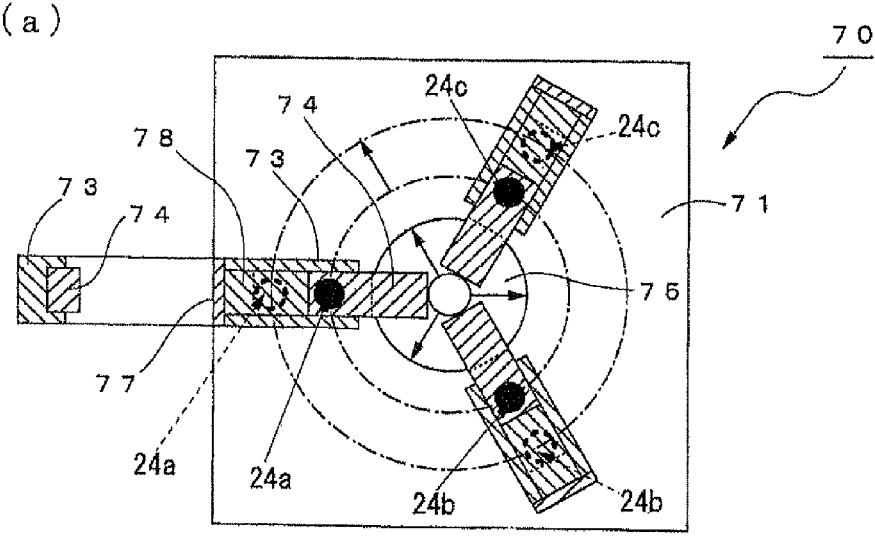
FIG. 5 is illustrations showing a structure of another tire grip means.
Figure 5:
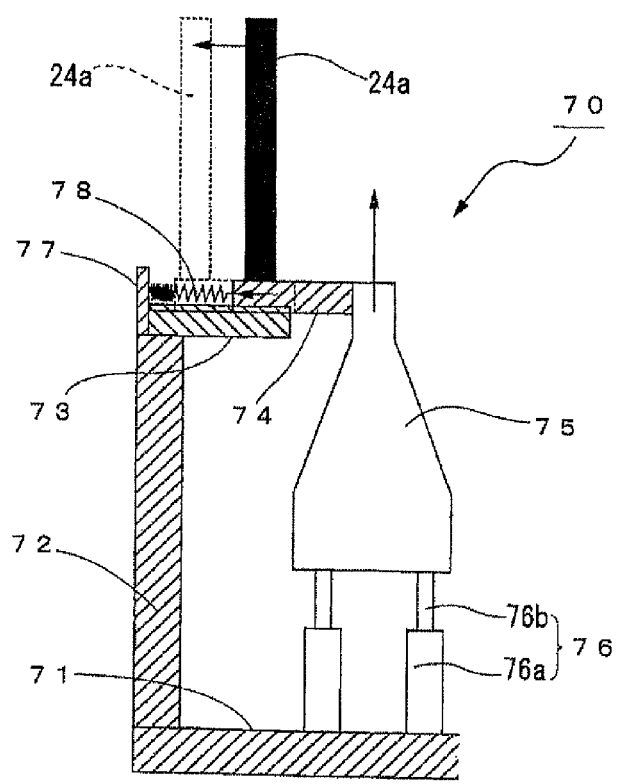

Alternatively, the arrangement may be such that an extension means 70, as shown in FIG. 5, is used to cause the grip arms 24a to 24c to simultaneously slide in the radial direction from the center thereof.

This extension means 70 may be constructed of a base 71, three support posts 72, rails 73, arm support bases 74, a rod-shaped member 75, and a lifting means 76.

The three support posts 72 are installed upright on the base 71 in a regular-triangular arrangement in a planar view. The rails 73 are located on the respective support posts 72, and the arm support bases 74 are placed on the rails 3 in such a manner as to be movable along the rails 73. The grip arms 24a to 24c are attached to the outer end portions of the arm support bases 74 (the center of the triangle being inside).

The rod-shaped member 75, which is a rod-shaped member of circular cross sections, the diameter being small in the top portion and getting larger toward the bottom portion, goes up and down with the operation of the lifting means 76. The lifting means 76 is constituted, for instance, by an air cylinder which has a cylinder body 76a and a not-shown rod 72b connected to a piston.

Provided on the outside of the rail 73 on the top face of the support post 72 is a spring mounting plate 77, and the spring mounting plate 77 and the arm support base 74 are connected with each other with a spring 78. The spring 78 applies a biasing force to the arm support base 74 in the inward direction, and the inside of the arm support base 74 is always in contact with the rod-shaped member 75.

By implementing a structure as described above, the diameter of the rod-shaped member 75 in contact with the arm support base 74 becomes larger with the rise of the rod-shaped member 75. As a result, the three arm support bases 74 simultaneously move radially outward on the rails 73 overcoming the spring force. Accordingly, the grip arms 24a to 24b can be opened, or spread from each other, concentrically around the circle in the initial position.

In the foregoing specification, the invention has been described with reference to specific embodiments thereof. However, the technical scope of the invention is not limited to the described scope of the embodiments. And it should be evident to those skilled in the art that various modifications and changes may be made thereto without departing from the spirit and scope of the invention. Accordingly, all such modifications and changes are intended to be included within the scope of this invention as defined in the appended claims.

INDUSTRIAL APPLICABILITY

As described above, the present invention allows the centering of a tire with a simple structure and helps prevent damage to the tire due to friction that may occur during tire rotation. Therefore, tire sorting can be carried out efficiently and reliably.

DESCRIPTION OF REFERENCE NUMERALS 10 tire sorting apparatus
20 tire grip means
21 base 22 center pin member
23 plate member
24a-24c grip arm
25 cylinder
26 cylinder support base
27 support frame
30 barcode reading means
31 barcode reader
32 barcode reader holding means
33 barcode reader rotating means
33a motor
33b arm
34 tire inside diameter detecting means
34a rotary encoder
34b tire inside diameter calculating means
35 rotation radius changing means
35a linear actuator body
35b rod
36 detecting position control means
40 mounting table
41 vertical frame
42 guide roller
43 bottom plate
44 transfer wheel
50 lifting means
51 cylinder body
52 rod
53 slide member
54 guide member
60 mounting stand
61 leg
62 lifting means mounting base
63 reading means mounting rack
63a horizontal plate
63b vertical plate
63c motor mounting plate
T tire
P11-P13 fixed-side pin member
P21-P23 movable-side pin member
P31-P33 intermediate pin member
A11-A13 fixed-side arm
A21-A23 movable-side arm
R11-R13 rotary roller

The invention claimed is:

1. A tire sorting apparatus comprising:
a mounting means for mounting a tire in a plane perpendicular to the center axis of the tire;
a tire grip means for gripping the inner periphery of the tire and positioning the center axis of the tire;
an identifier reading means for reading a tire identification marking formed on a surface of the tire; and
a holding means for holding the identifier reading means,
wherein the tire grip means further includes three grip arms arranged at the vertexes of a triangle within a plane perpendicular to the center axis of the tire and extending in a direction parallel to the center axis of the tire, and an arm opening and closing mechanism for opening the three grip arms concentrically around the circle circumscribing the triangle,
wherein the holding means further includes a holding unit for holding the identifier reading means, and a rotation drive unit connected to the holding unit for rotating the holding means around a rotation axis parallel to the center axis of the tire,
wherein the center of the circumscribing circle is aligned with the rotation axis of the holding unit, and
wherein the identifier reading means is held by the holding unit in such a manner that a rotation center of the identifier reading means corresponds with a rotation center of the holding unit, rotates with respect to the tire, and reads the tire identification marking formed on the surface of the tire positioned by the tire grip means while the identifier reading means is rotating.

2. The tire sorting apparatus according to claim 1, further comprising a tire inside diameter detecting means for detecting a tire inside diameter from positional data or travel distance data of the three grip arms when the grip arms are gripping a tire.

3. A tire sorting apparatus comprising:
a mounting means for mounting a tire in a plane perpendicular to the center axis of the tire;
a tire grip means for gripping the inner periphery of the tire and positioning the center axis of the tire, the tire grip means further includes three grip arms arranged at the vertexes of a triangle within a plane perpendicular to the center axis of the tire extending in a direction parallel to the center axis of the tire, and an arm opening and closing mechanism for opening the three grip arms concentrically around the circle circumscribing the triangle;
an identifier reading means for reading a tire identification marking formed on a surface of the tire;
a holding means for holding the identifier reading means, the holding means further includes a holding unit for holding the identifier reading means, and a rotation drive unit connected to the holding unit for rotating the holding mans around a rotation axis parallel to the center axis of the tire;
a tire inside diameter detecting means for detecting a tire inside diameter from positional data or travel distance data of the three grip arms when the grip arms are gripping a tire; and
a rotation radius changing means for changing the distance between the identifier reading means and the rotation axis of the holding unit, and a detecting position control means for controlling the rotation radius changing means in such a manner as to move the identifier reading means to the position of the tire identifier based on the data of the tire inside diameter detected by the tire inside diameter detecting means,
wherein the center of the circumscribing circle is aligned with the rotation axis of the holding unit, and
wherein the identifier reading means is held by the holding unit in such a manner that a rotation center of the identifier reading means corresponds with a rotation center of the holding unit, rotates with respect to the tire, and reads the tire identification marking formed on the surface of the tire positioned by the tire grip means.

4. The tire sorting apparatus according to claim 1, wherein the mounting means has a plurality of rotating bodies rotating in contact with the lower surface of the tire and a through hole through which the three grip arms are extended toward the inner periphery of the tire.

5. A tire sorting apparatus comprising:
a mounting means for mounting a tire in a plane perpendicular to the center axis of the tire;
a tire grip means for gripping the inner periphery of the tire and positioning the center axis of the tire;
an identifier reading means for reading a tire identification marking formed on a surface of the tire; and
a holding means for holding the identifier reading means,
wherein the tire grip means further includes three grip arms arranged at the vertexes of a triangle within a plane perpendicular to the center axis of the tire and extending in a direction parallel to the center axis of the tire, and an arm opening and closing mechanism for opening the three grip arms concentrically around the circle circumscribing the triangle, wherein the holding means further includes a holding unit for holding the identifier reading means, and a rotation drive unit connected to the holding unit for rotating the holding means around a rotation axis parallel to the center axis of the tire, wherein the center of the circumscribing circle is aligned with the rotation axis of the holding unit, wherein the identifier reading means is held by the holding unit in such a manner that a rotation center of the identifier reading means corresponds with a rotation center of the holding unit, rotates with respect to the tire, and reads the tire identification marking formed on the surface of the tire positioned by the tire grip means, wherein the arm opening and closing mechanism includes a base which is a fixed-side member, a center pin member rotatable installed upright on the base, a plate member which is a movable-side member fixed to the center pin member, link mechanisms linking the plate member to each of the grip arms, and a drive means for driving the rotation of the plate member, wherein each of the link mechanisms includes a fixed-side pin member provided in a position corresponding to each of the vertexes of a polygon inscribed in a circle centered around the center axis of the center pin member on the base, a movable-side pin member provided in a position corresponding to each of the vertexes of a polygon inscribed in a circle centered around the center axis of the center pin member of the plate member, a fixed-side arm rotatably attached to the fixed-side pin member, a movable-side arm rotatably attached to the movable-side pin member, and an intermediate pin member rotatably connecting the fixed-side arm with the movable-side arm, and wherein the three grip arms are installed upright on the fixed-side arms and the drive means rotate the plate member around the center pin member.

6. A tire sorting apparatus comprising:

a mounting means for mounting a tire in a plane perpendicular to the center axis of the tire;

a tire grip means for gripping the inner periphery of the tire and positioning the center axis of the tire, the tire grip means further includes three grip arms arranged at the vertexes of a triangle within a plane perpendicular to the center axis of the tire and extending in a direction parallel to the center axis of the tire, and an arm opening and closing mechanism for opening the three grip arms concentrically around the circle circumscribing the triangle, an identifier reading means for reading a tire identification marking formed on a surface of the tire; and a holding means for holding the identifier reading means; and a tire inside diameter detecting means for detecting a tire inside diameter from positional data or travel data of the three grip arms when the grip arms are gripping a tire, wherein the holding means further includes a holding unit for holding the identifier reading means, and a rotation drive unit connected to the holding unit for rotating the holding means around a rotation axis parallel to the center axis of the tire, wherein the center of the circumscribing circle is aligned with the rotation axis of the holding unit, wherein the identifier reading means is held by the holding unit in such a manner that a rotation center of the identifier reading means corresponds with a rotation center of the holding unit, rotates with respect to the tire, and reads the tire identification marking formed on the surface of the tire positioned by the tire grip means, wherein the arm opening and closing mechanism includes a base which is a fixed-side member, a center pin member rotatable installed upright on the base, a plate member which is a movable-side member fixed to the center pin member, link mechanisms linking the plate member to each of the grip arms, and a drive means for driving the rotation of the plate member, wherein each of the link mechanisms includes a fixed-side pin member provided in a position corresponding to each of the vertexes of a polygon inscribed in a circle centered around the center axis of the center pin member on the base, a movable-side pin member provided in a position corresponding to each of the vertexes of a polygon inscribed in a circle centered around the center axis of the center pin member of the plate member, a fixed-side arm rotatably attached to the fixed-side pin member, a movable-side arm rotatably attached to the movable-side pin member, and an intermediate pin member rotatably connecting the fixed-side arm with the movable-side arm, and wherein the three grip arms are installed upright on the fixed-side arms and the drive means rotate the plate member around the center pin member.

7. The tire sorting apparatus according to claim 3, wherein the arm opening and closing mechanism includes a base which is a fixed-side member, a center pin member rotatably installed upright on the base, a plate member which is a movable-side member fixed to the center pin member, link mechanisms linking the plate member to each of the grip arms, and a drive means for driving the rotation of the plate member, wherein each of the link mechanisms includes a fixed-side pin member provided in a position corresponding to each of the vertexes of a polygon inscribed in a circle centered around the center axis of the center pin member on the base, a movable-side pin member provided in a position corresponding to each of the vertexes of a polygon inscribed in a circle centered around the center axis of the center pin member of the plate member, a fixed-side arm rotatably attached to the fixed-side pin member, a movable-side arm rotatably attached to the movable-side pin member, and an intermediate pin member rotatably connecting the fixed-side arm with the movable-side arm, and wherein the three grip arms are installed upright on the fixed-side arms and the drive means rotate the plate member around the center pin member.

8. A tire apparatus comprising:

a mounting means for mounting a tire in a plane perpendicular to the center axis of the tire;

a tire grip means for gripping the inner periphery of the tire and positioning the center axis of the tire;

an identifier reading means for reading a tire identification marking formed on a surface of the tire; and a holding means for holding the identifier reading means, wherein the tire grip means further includes three grip arms arranged at the vertexes of a triangle within a plane perpendicular to the center axis of the tire and extending in a direction parallel to the center axis of the tire, and an arm opening and closing mechanism for opening the three grip arms concentrically around the circle circumscribing the triangle, wherein the holding means further includes a holding unit for holding the identifier reading means, and a rotation drive unit connected to the holding unit for rotating the holding means around a rotation axis parallel to the center axis of the tire, wherein the center of the circumscribing circle is aligned with the rotation axis of the holding unit, wherein the identifier reading means is held by the holding unit in such a manner that a rotation center of the identifier reading means corresponds with a rotation center of the holding unit, rotates with respect to the tire, and reads the tire identification marking formed on the surface of the tire positioned by the tire grip means, wherein the mounting means has a plurality of rotating bodies rotating in contact with the lower surface of the tire and a through hole through which the three grip arms are extended toward the inner periphery of the tire, wherein the arm opening and closing mechanism includes a base which is a fixed-side member, a center pin member rotatable installed upright on the base, a plate member which is a movable-side member fixed to the center pin member, link mechanisms linking the plate member to each of the grip arms, and a drive means for driving the rotation of the plate member, wherein each of the link mechanisms includes a fixed-side pin member provided in a position corresponding to each of the vertexes of a polygon inscribed in a circle centered around the center axis of the center pin member on the base, a movable-side pin member provided in a position corresponding to each of the vertexes of a polygon inscribed in a circle centered around the center axis of the center pin member of the plate member, a fixed-side arm rotatably attached to the fixed-side pin member, a movable-side arm rotatably attached to the movable-side pin member, and an intermediate pin member rotatably connecting the fixed-side arm with the movable-side arm, and wherein the three grip arms are installed upright on the fixed-side arms and the drive means rotate the plate member around the center pin member.

\* \* \* \* \*